(12) United States Patent
Wenske et al.

(10) Patent No.: US 8,896,351 B2
(45) Date of Patent: Nov. 25, 2014

(54) LINE DRIVER METHOD AND APPARATUS

(75) Inventors: Holger Wenske, Freising (DE); Thomas Eichler, Unterhaching (DE); Mario Traber, Diesenhofen (DE)

(73) Assignee: Lantiq Deutschland GmbH, Neubiberg (DE)

( * ) Notice: Subject to any disclaimer, the term of this patent is extended or adjusted under 35 U.S.C. 154(b) by 981 days.

(21) Appl. No.: 12/051,254

(22) Filed: Mar. 19, 2008

(65) Prior Publication Data

US 2009/0237122 A1    Sep. 24, 2009

(51) Int. Cl.
*H03K 3/00* (2006.01)
*H04L 25/02* (2006.01)

(52) U.S. Cl.
CPC .................................. *H04L 25/0264* (2013.01)
USPC .......................................... 327/108; 327/112

(58) Field of Classification Search
USPC .......................... 327/108–112, 379, 389, 391; 326/21–24, 26–27, 30, 82–83, 87
See application file for complete search history.

(56) References Cited

U.S. PATENT DOCUMENTS

| | | | |
|---|---|---|---|
| 5,134,311 A | 7/1992 | Biber et al. | |
| 5,528,630 A | 6/1996 | Ashley et al. | |
| 5,856,758 A | 1/1999 | Joffe et al. | |
| 6,097,245 A | 8/2000 | Dobbelaere et al. | |
| 6,100,717 A | 8/2000 | May | |
| 6,762,625 B1 | 7/2004 | Devnath | |
| 6,795,495 B2 * | 9/2004 | Koren | 375/219 |
| 6,919,742 B1 | 7/2005 | McGlinchey | |
| 6,970,515 B1 * | 11/2005 | Bicakci et al. | 375/257 |
| 7,250,793 B2 * | 7/2007 | Lu | 327/108 |
| 7,912,383 B2 * | 3/2011 | Cheng et al. | 398/210 |
| 2004/0150434 A1 * | 8/2004 | Lu | 327/112 |
| 2004/0257127 A1 * | 12/2004 | Levin et al. | 327/112 |
| 2005/0057274 A1 * | 3/2005 | Groen et al. | 326/27 |
| 2005/0113034 A1 * | 5/2005 | Mangino et al. | 455/80 |
| 2006/0050036 A1 * | 3/2006 | Miura | 345/89 |

FOREIGN PATENT DOCUMENTS

| | | |
|---|---|---|
| EP | 1111865 A2 | 6/2001 |
| EP | 1330874 A1 | 7/2003 |
| WO | 00/78013 A1 | 12/2000 |
| WO | 00/79693 A1 | 12/2000 |
| WO | 02/25814 A1 | 3/2002 |
| WO | 02/065662 A2 | 8/2002 |

OTHER PUBLICATIONS

Texas Instruments, Dallas, TX publication from the 2001 IEEE International Solid-State Circuits Conference "An ADSL Central Office Analog Front-End Integrating Actively-Terminated Line Driver, Receiver and Filters". Written by M. Cresi, R. Hester, K. Maclean, M. Agah, J. Quarfoot, C. Kozak, N. Gibson, and T. Hagen.
Richter, Heinz; "Neve Schule de Radiotechnik and Elektronik", 1964, pp. 50-63.

(Continued)

*Primary Examiner* — An Luu (57) ABSTRACT

According to one embodiment, a line driver circuit comprises a plurality of output stages each operable to produce an output signal and one or more pre-output stages operable to perform one or more common functions. The line driver circuit also comprises circuitry operable to selectively couple one or more of the output stages to the one or more pre-output stages based on a wireline communication technology implemented by the line driver circuit.

16 Claims, 4 Drawing Sheets

(56) References Cited

OTHER PUBLICATIONS

Publication from the 2000 Symposium on VLSI Circuits Digest of Technical Papers, Analog Devices, Inc., Somerset, NJ, pp. 178-181 from section entitled Analog Front End IC for Category I & II ADSL. Written by John Guido, Vincent Leung, John Kenney, Joe Trackim, Anthony Agrillo, Ed Zimany, and Reza Shariatdoust.

IEEE Journal of Solid-State Circuits, vol. 25, No. 4, Aug. 1990, entitled the Implementation of Digital Echo Cancellation in Codecs, pp. 979-986. Written by Vladimir Friedman, John M. Khoury, Michael Theobald, and Venu P. Gopal.

EDN Access, for Design, by Design, publication dated Jan. 6, 1994, Figure 1 from the section entitled Line Driver Economically Synthesizes Impedance. Written by Victor Koren, Orckit Communication Ltd, Ramat-Gan, Israel.

International Telecommunication Union publication ITU-T G.992.1 dated Jun. 1999 entitled Series G: Transmission Systems and Media, Digital Systems and Networks, Digital Transmission Systems—Digital Sections and Digital Line System—Access Networks, Asymmetric digital subscriber line (ADSL) Transceivers.

Office Action issued Jun. 17, 2010 in re German application 10 2009 013 805.6-35.

* cited by examiner

LINE DRIVER METHOD AND APPARATUS

BACKGROUND OF THE INVENTION

Wireline communication systems often support more than one communication technology. For example, a conventional wireline communication system may support several different Ethernet technologies such as 10BASE-T (10 Mbit/s), 100BASE-T (100 Mbit/s), Gigabit Ethernet (1 Gbit/s), 10 Gigabit Ethernet (10 Gbit/s) and/or 100 Gigabit Ethernet (100 Gbit/s). In another example, both DSL (digital subscriber line) and E-carrier/T-carrier technology (E1/T1) may be supported. Line driver circuitry included in such systems must be capable of supporting the output operating conditions specified by each supported technology such as output voltage swing, output current, termination impedance, gain, bandwidth, etc. Otherwise, signal quality degrades significantly.

Different wireline communication technologies often have widely dissimilar output operating conditions. Some types of conventional line driver circuits accommodate the worst-case output operating condition, sacrificing power, signal quality and/or performance when operating under less extreme conditions. For example, a line driver circuit may be designed to operate at the greatest output voltage swing supported by the system. However, power is wasted when the line driver operates in accordance with a different wireline communication technology having a lower output voltage swing condition. Another conventional approach involves changing the external devices coupled to the line driver circuitry that affect the output operating conditions such as transformer winding ratios, external termination impedances, etc. This way, external components may be switched out or externally re-configured to implement a different wireline communication technology. This approach increases the area and cost of the system and limits configurability.

Another issue facing wireline communication systems is the increasing number of output ports included in such systems. This is particularly applicable for Ethernet-based systems, where four line drivers are typically employed per Ethernet port. Ethernet line drivers conventionally have a negligible output impedance and a termination impedance matched to the line impedance for reducing interference. The line driver supply voltage is typically at least twice the output signal swing of the driver to account for the voltage drop at the termination impedance. Thus, at least half of the power consumed by the line driver is wasted. Heating also becomes problematic as the number of ports (and thus line driver circuits) increases. Moreover, it becomes extremely difficult to fabricate Ethernet line drivers using advanced semiconductor technologies because high supply voltage requirements typically exceed technology voltage limits. Device breakdown occurs if these voltage limits are exceeded.

SUMMARY OF THE INVENTION

According to one embodiment, a line driver circuit comprises a plurality of output stages each operable to produce an output signal and one or more pre-output stages operable to perform one or more common functions. The line driver circuit also comprises circuitry operable to selectively couple one or more of the output stages to the one or more pre-output stages based on a wireline communication technology implemented by the line driver circuit. In one embodiment, at least one of the output stages includes an Ethernet-compliant voltage-mode line driver having a synthesized output impedance and a termination impedance less than the transmission line impedance.

Of course, the present invention is not limited to the above features and advantages. Those skilled in the art will recognize additional features and advantages upon reading the following detailed description, and upon viewing the accompanying drawings.

DETAILED DESCRIPTION OF THE INVENTION

Figure 1:
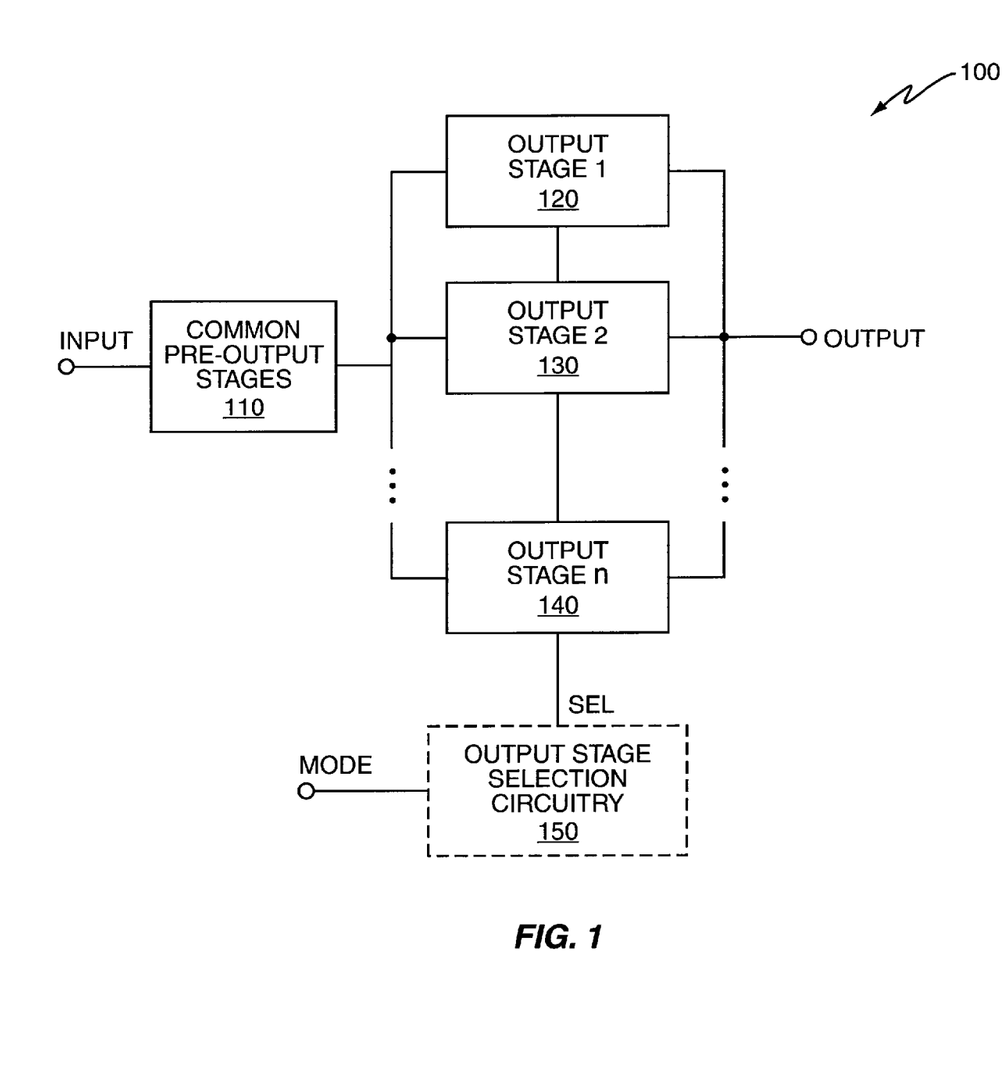
FIG. 1 is a block diagram of an embodiment of a line driver circuit including one or more common pre-output stages and a plurality of selectable output stages.

FIG. 1 illustrates an embodiment of a line driver circuit 100 including one or more common pre-output stages 110 and a plurality of output stages 120, 130 and 140. Each pre-output stage 110 performs one or more functions common to all output stages 120, 130 and 140 included in the line driver circuit 100 such as signal amplification, common mode regulation, output stage biasing, etc. Each output stage 120, 130 and 140 coupled to the common stage(s) 110 produces an output signal in compliance with a different wireline communication technology. This way, the line driver circuit 100 can implement any one of a plurality of supported wireline communication technologies by coupling the appropriate output stage or stages 120, 130 and/or 140 to the common stage(s) 110 and decoupling remaining output stages from the common stage(s) 110.

Each output stage 120, 130 and/or 140 coupled to the common stage(s) 100 functions in accordance with the wireline communication technology implemented by the line driver circuit 100. The remaining output stages provide a response tailored for other wireline communication technologies, and are thus decoupled from the common stage(s) 110 so that they do not adversely affect the line driver output. Power consumption, performance and signal quality are optimized by activating only those output stages 120, 130 and/or 140 tailored to the wireline communication technology implemented by the line driver circuit 100.

To this end, the line driver circuit 100 includes circuitry 150 for controlling which ones of the output stages 120, 130 and/or 140 are coupled to the common pre-output stage(s) 110 and which ones are not. The output stage selection circuitry 150 makes this determination based on the wireline communication technology currently implemented by the line driver circuit 100. The wireline communication technology implemented by the line driver circuit 100 is indicated by a MODE input provided to the selection circuitry 150 as shown in FIG. 1. In one embodiment, the MODE input is hardwired, e.g., via fuses, wire bonds, pins, etc. (not shown). In another embodiment, the MODE input is programmable. According to this embodiment, the selection circuitry 150 reacts to changes in the MODE input by altering which output stages 120, 130 and/or 140 are coupled to the common stage(s) 110. This way, the line driver circuit 100 can be readily re-configured to implement a different wireline communication technology by changing the MODE input.

The line driver circuit 100 may support any number of wireline communication technologies. In one embodiment, at least two different Ethernet technologies are supported such as 10BASE-T, 100BASE-T, Gigabit Ethernet, 10 Gigabit Ethernet and/or 100 Gigabit Ethernet. Each output stage 120, 130 and/or 140 corresponding to the Ethernet technology implemented by the line driver circuit 100 is coupled to the common pre-output stage(s) 110 so that the line driver output (OUTPUT) properly conforms to that Ethernet technology. In another embodiment, the line driver circuit 100 supports both xDSL (x being a placeholder for different DSL technologies) and E1/T1 technologies. The output stage or stages 120, 130 and/or 140 corresponding to DSL are coupled to the common stage(s) 110 when the MODE input indicates the line driver circuit 100 is configured for DSL. Otherwise, the output stage or stages 120, 130 and/or 140 associated with E1/T1 are coupled to the common stage(s) 110. The line drive circuit 100 generally has one or more output stages 120, 130 and/or 140 configured for each wireline communication technology supported by the line driver circuit 100.

Each output stage 120, 130 and 140 generates a signal that conforms to the output operating conditions specified by a particular wireline communication technology such as output voltage swing, output current, termination impedance, gain, bandwidth, etc. In one embodiment, the output stage or stages 120, 130 and/or 140 coupled to the common stage(s) 110 by the selection circuitry 150 output a signal satisfying the voltage and current conditions associated with the wireline communication technology indicated by the MODE input. This way, each output stage 120, 130 and 140 can be tailored to a particular wireline communication technology while the pre-output stage(s) 110 are common to all output stages, reducing circuit redundancy and optimizing the overall area of the line driver circuit 100. In one embodiment, one or more of the common stage(s) 110 comprise biasing circuitry for biasing each output stage coupled to the common stage(s) 110. The amount of bias provided by the common biasing circuitry is programmable based on the number and performance requirements of output stages 120, 130 and 140 coupled to the common stage(s) 110, ensuring proper output stage operation.

Figure 2:
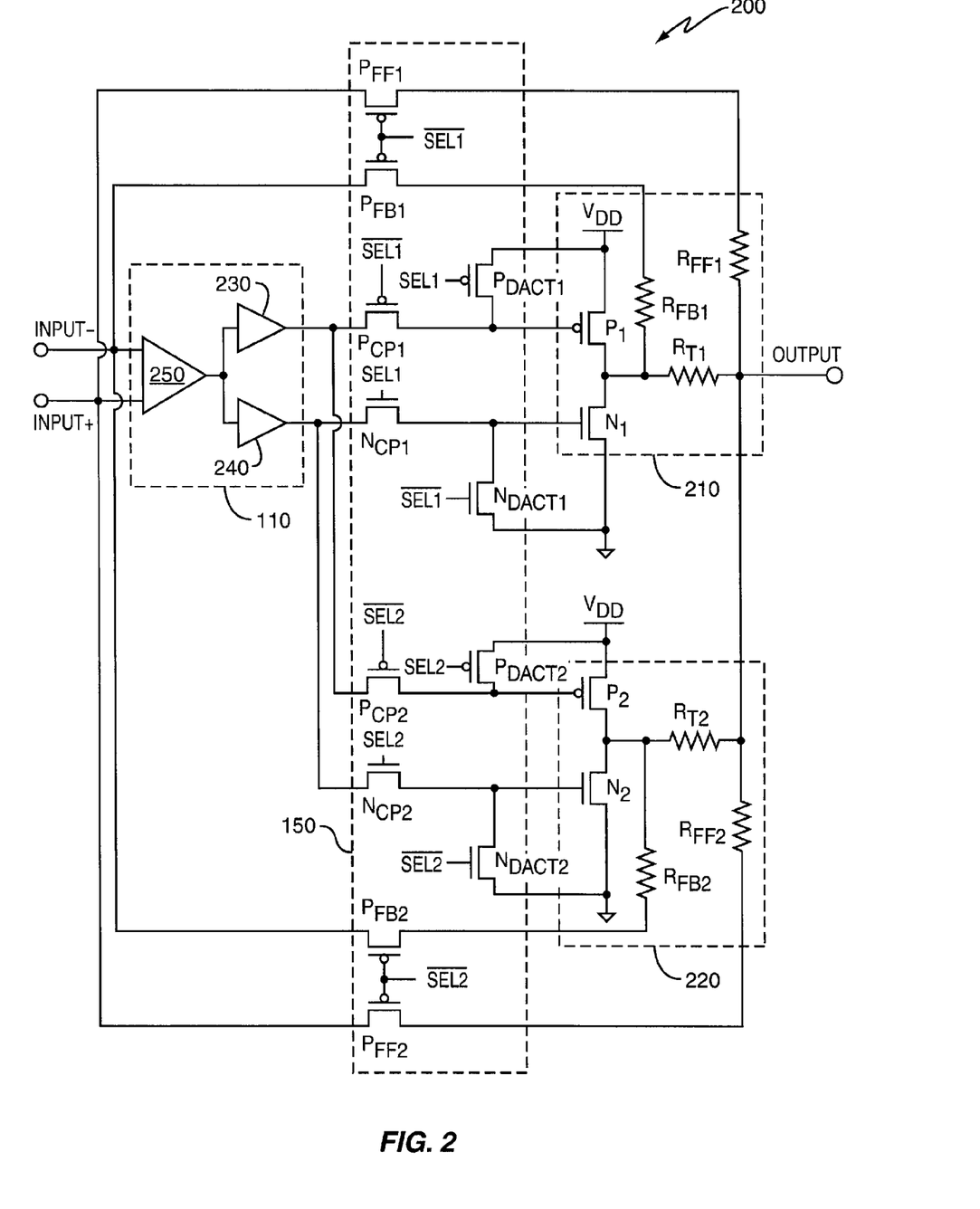
FIG. 2 is a block diagram of another embodiment of a line driver circuit including one or more common pre-output stages and a plurality of selectable output stages.

FIG. 2 illustrates another embodiment of a line driver circuit 200 including a plurality of selectable output stages 210, 220. According to this embodiment, each output stage 210, 220 includes a feedback impedance $R_{FBn}$, a feed-forward impedance $R_{FFn}$, a termination impedance $R_{Tn}$ and an inverting amplifier comprising a p-FET Pn and an n-FET Nn. In other embodiments, the feedback and/or feed-forward impedances $R_{FBn}$, $R_{FFn}$ may be part of the common pre-output stage(s) 110. The impedances $R_{FBn}$, $R_{FFn}$ and $R_{Tn}$ are shown as resistors with no reactance in FIG. 2. However, any of the impedances $R_{FBn}$, $R_{FFn}$ and $R_{Tn}$ may have both a real part (resistance) and an imaginary part (reactance) to obtain frequency-dependent behavior. Regardless, the inverting amplifier Pn/Nn included in each output stage 210, 220 is sized to meet the output voltage swing and output current conditions of a different wireline communication technology. Two output stages 210, 220 are shown in FIG. 2 for ease of illustration only. Those skilled in the art will readily recognize that any desired number of output stages may be included in the line driver circuit 200.

In more detail, the common drain output of each inverting amplifier Pn/Nn is coupled to the respective termination impedance $R_{Tn}$. In one embodiment, each output stage 210, 220 includes a dedicated termination impedance $R_{Tn}$ tailored to a particular wireline communication technology as shown in FIG. 2. Alternatively, one or more of the output stages 210, 220 share a common termination impedance (not shown). Either way, each output stage 210, 220 generates a signal in accordance with a particular wireline communication technology. The common drain output of each inverting amplifier Pn/Nn is selectively fed-back to the line driver input (INPUT) via the respective feedback impedance $R_{FBn}$. Each output stage 210, 220 may include a dedicated feedback impedance $R_{FBn}$ tailored to a particular wireline communication technology as shown in FIG. 2. Alternatively, one or more of the output stages 210, 220 share a common feedback impedance (not shown). Either way, the feedback impedance $R_{FBn}$ provides a mechanism for feeding back the output signal to the line driver input. In one embodiment, the line driver input is differential and the common drain output of each inverting amplifier Pn/Nn is selectively coupled to one differential input (e.g., INPUT−) of the line driver input via the respective feedback impedance $R_{FBn}$.

The common drain output of each inverting amplifier Pn/Nn is also coupled to a common output node (OUTPUT) via the respective termination impedances $R_{Tn}$. The feed-forward impedances $R_{FFn}$ selectively fed the line driver input to the common output node. Each output stage 210, 220 may include a dedicated feed-forward impedance $R_{FFn}$ tailored to a particular wireline communication technology as shown in FIG. 2. Alternatively, one or more of the output stages 210, 220 share a common feed-forward impedance (not shown). In one embodiment, the respective feed-forward impedances $R_{FFn}$ selectively couple the common output node to the other differential input (e.g., INPUT+) of the line driver input.

The feedback and feed-forward impedances $R_{FBn}$, $R_{FFn}$ cause the inverting amplifiers Pn/Nn to have a non-negligible output impedance. This way, the termination impedance $R_{Tn}$ can be lowered to reduce power consumption while still matching the overall output impedance of the line driver circuit 200 to the impedance of a transmission line (not shown) connected to the line driver circuit 200. The overall impedance of the nth output stage is the sum of the inverting amplifier impedance and the termination impedance associated with output stage n. The termination impedance for stage n is given by:

$$R_{Tn} = R_{LINE} \times (1 - f_{S1}) \qquad (1)$$

where $f_{S1}$ is a scaling factor corresponding to the ratio of the feedback to feed-forward impedances $R_{FBn}$, $R_{FFn}$ for stage n, and $R_{LINE}$ is the transmission line impedance. Accordingly, the supply voltage ($V_{DD}$) applied to the output stages 210, 220 can be reduced because the voltage drop across the termination impedance $R_{Tn}$ is reduced by the scaling factor $f_{S1}$.

The output stage selection circuitry 150 couples the appropriate output stage or stages 210, 220 to the common pre-output stages 110 based on the wireline communication technology being implemented by the line driver circuit 200. According to the embodiment illustrated in FIG. 2, the selection circuitry 150 includes a plurality of switches. A first set of switches $P_{FF1}/P_{FF2}$ controls which feed-forward impedance $R_{FFn}$ is coupled to the line driver input. A second set of switches $P_{FB1}/P_{FB2}$ similarly controls which feedback impedance $R_{FBn}$ is coupled to the line driver input. A third set of switches $P_{CP1}$, $N_{CP1}/P_{CP2}$, $N_{CP2}$ controls which ones of the output stages 210, 220 are coupled to the common stages 110 and which ones are not. Particularly, switch $P_{CPn}$ selectively couples p-FET Pn of the nth output stage to a first common buffer 230. Switch $N_{CPn}$ couples the corresponding n-FET Nn to a second common buffer 240. The common buffers 230, 240 are driven by a common amplifier 250. This way, the nth output stage is coupled to the common buffers 230, 240 and common amplifier 250 when switches $P_{CPn}$ and $N_{CPn}$ are closed.

A fourth set of switches $P_{DACT1}$, $N_{DACT1}$/$P_{DACT2}$, $N_{DACT2}$ deactivates each output stage 210, 220 decoupled from the common stages 100. Particularly, switch $P_{DACTn}$ selectively ties the gate of p-FET Pn of the nth output stage to the supply voltage when the nth output stage is decoupled from the common buffers 230, 240 and common amplifier 250. Switch $N_{DACTn}$ similarly deactivates the corresponding n-FET Nn by selectively tying its gate to ground. The selection circuitry switches $P_{FF1}$, $P_{FF2}$, $P_{FB1}$, $P_{FB2}$, $P_{CP1}$, $N_{CP1}$, $P_{CP2}$, $N_{CP2}$, $P_{DACT1}$, $N_{DACT1}$, $P_{DACT2}$, and $N_{DACT2}$ are actuated by one or more signals generated based on the wireline communication technology currently implemented by the line driver circuit 200.

In one embodiment, the first output stage 210 is coupled to the common stages 110 by activating signal $\overline{SEL1}$ (driving the signal to a logic zero level). The second stage 220 can be decoupled from the common stages 110 by deactivating signal $\overline{SEL2}$ (driving the signal to a logic high level). Conversely, the second output stage 220 can be coupled to the common stages 110 by activating $\overline{SEL2}$ and the first stage 210 decoupled from the common stages 110 by deactivating signal $\overline{SEL1}$. This way, operation of the line drive circuit 200 can be optimized for a particular wireline communication technology by coupling the appropriate output stage or stages 210, 220 to the common stage(s) 110.

Figure 3:
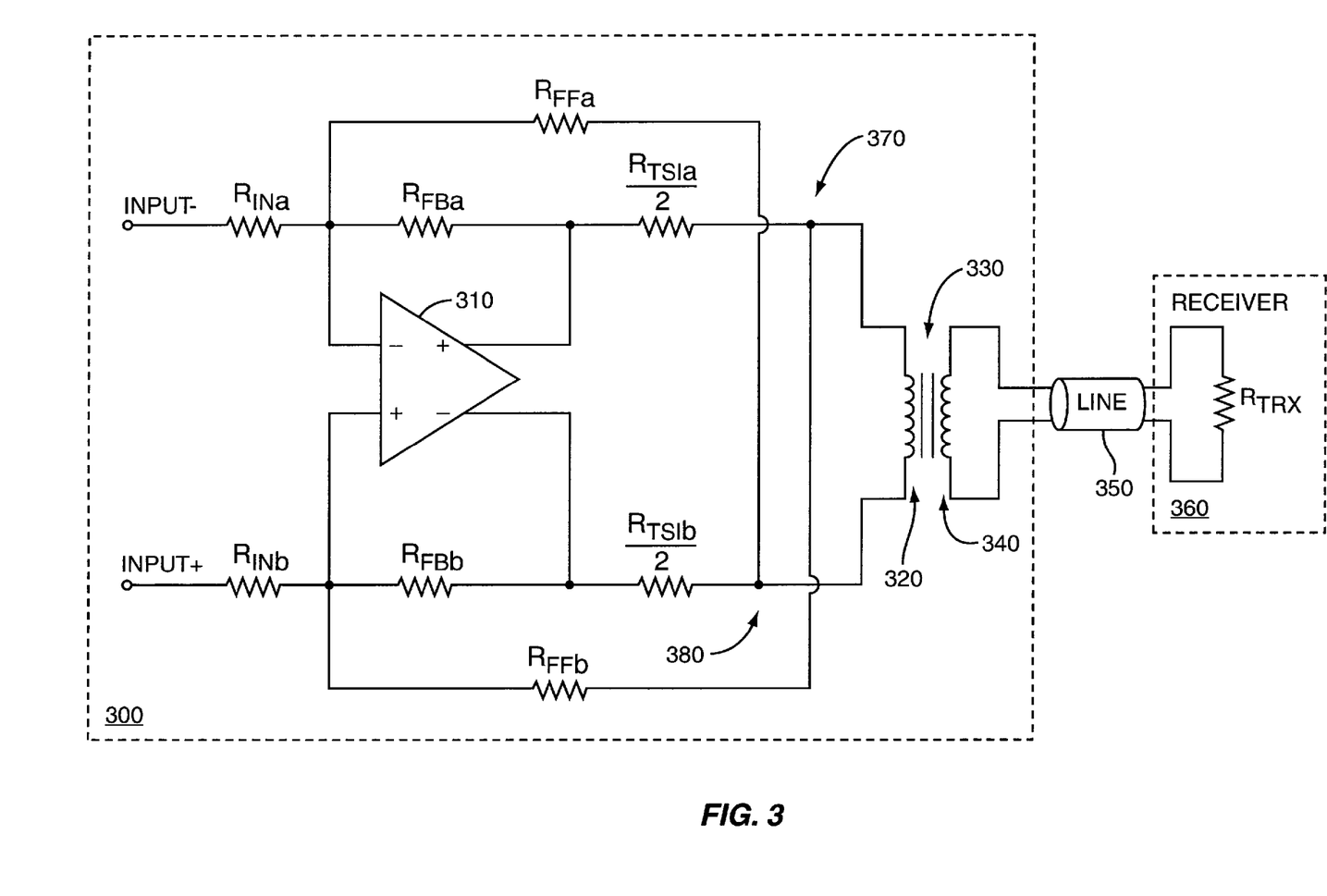
FIG. 3 is a block diagram of an embodiment of an Ethernet-compliant line driver output stage.

FIG. 3 illustrates one embodiment of an output stage 300 that may be included in the line driver circuits 100 and 200 of FIGS. 1 and 2, respectively. According to this embodiment, the output stage 300 is tailored for Ethernet technologies such as 10BASE-T, 100BASE-T, Gigabit Ethernet, 10 Gigabit Ethernet and/or 100 Gigabit Ethernet. The output stage 300 includes a voltage-mode line driver 310 for generating an Ethernet-compliant output signal. A termination impedance $R_{TSI}$ couples the line driver output to the primary winding 320 of a transformer 330. The secondary winding 340 of the transformer 330 is coupled to a transmission line 350 which in turn is coupled to an Ethernet receiver 360 having a termination impedance $R_{TRX}$. The termination impedance $R_{TSI}$ of the output stage 300 is less than the transmission line impedance, reducing power consumption. Yet, the total output impedance of the output stage 300 is relatively well matched to the transmission line impedance to reduce interference. Moreover, the magnitude of the termination impedance $R_{TSI}$ can be modified. Changing the magnitude of the termination impedance $R_{TSI}$ alters the magnitude of the voltage output swing applied to the primary winding 320, enabling the output stage 300 to accommodate different Ethernet technologies.

To this end, the output stage 300 includes feedback and feed-forward impedances $R_{FB}$ and $R_{FF}$. The feedback and feed-forward impedances $R_{FB}$ and $R_{FF}$ cause the voltage-mode line driver 310 to have a non-negligible output impedance, enabling the termination impedance $R_{TSI}$ to be less than the transmission line impedance ($R_{LINE}$) as given by equation (1) above. Also, the magnitude of the termination impedance $R_{TSI}$ depends on the magnitude of the feedback and feed-forward impedances $R_{FB}$ and $R_{FF}$. Accordingly, different Ethernet technologies can be supported by modifying the feedback and/or feed-forward impedance $R_{FB}$/$R_{FF}$.

In more detail, a first feedback impedance element $R_{FBa}$ couples the positive output of the voltage-mode line driver 310 to the negative input of the line driver 310. A second feedback impedance element $R_{FBb}$ similarly couples the negative line driver output to the positive line driver input. Input impedance $R_{IN}$ couples the input signal to the line driver input. A first termination impedance element $R_{TSIa/2}$ couples one input terminal 370 of the primary winding 320 to the positive line driver output. A second termination impedance element $R_{TSIb/2}$ couples a second input terminal 380 of the primary winding 320 to the negative line driver output. The first and second termination impedance elements $R_{TSIa/2}$ and $R_{TSIb/2}$ are approximately ½ the magnitude of the total termination impedance $R_{TSI}$.

The termination impedance elements $R_{TSIa/2}$ and $R_{TSIb/2}$ sense the voltage and current output by the voltage-mode line driver 310. A first feed-forward impedance element $R_{FFa}$ couples the negative differential input signal (INPUT−) to the second input terminal 380 of the primary winding 320. A second feed-forward impedance element $R_{FFb}$ similarly couples the positive differential input signal (INPUT+) to the first input terminal 370 of the primary winding 320. The non-negligible output impedance of the voltage-mode line driver 310 is synthesized based on the magnitude of the feedback and feed-forward impedances $R_{FB}$ and $R_{FF}$. The total output impedance of the output stage 300 is the sum of the non-negligible line driver output impedance and the termination impedance $R_{TSI}$ and approximately matches the transmission line impedance. The magnitude of the termination impedance $R_{TSI}$ corresponds approximately to the magnitude of the difference between the transmission line impedance ($R_{LINE}$) and the non-negligible output impedance of the voltage-mode line driver 310 as represented by the scaling factor $f_{S1}$ in equation (1). The impedances $R_{FB}$, $R_{FF}$ and $R_{TSI}$ are shown as resistors with no reactance in FIG. 3. However, any of the impedances $R_{FB}$, $R_{FF}$ and $R_{TSI}$ included in the output stage 300 may have both real and imaginary parts to obtain frequency-dependent behavior.

Figure 4:
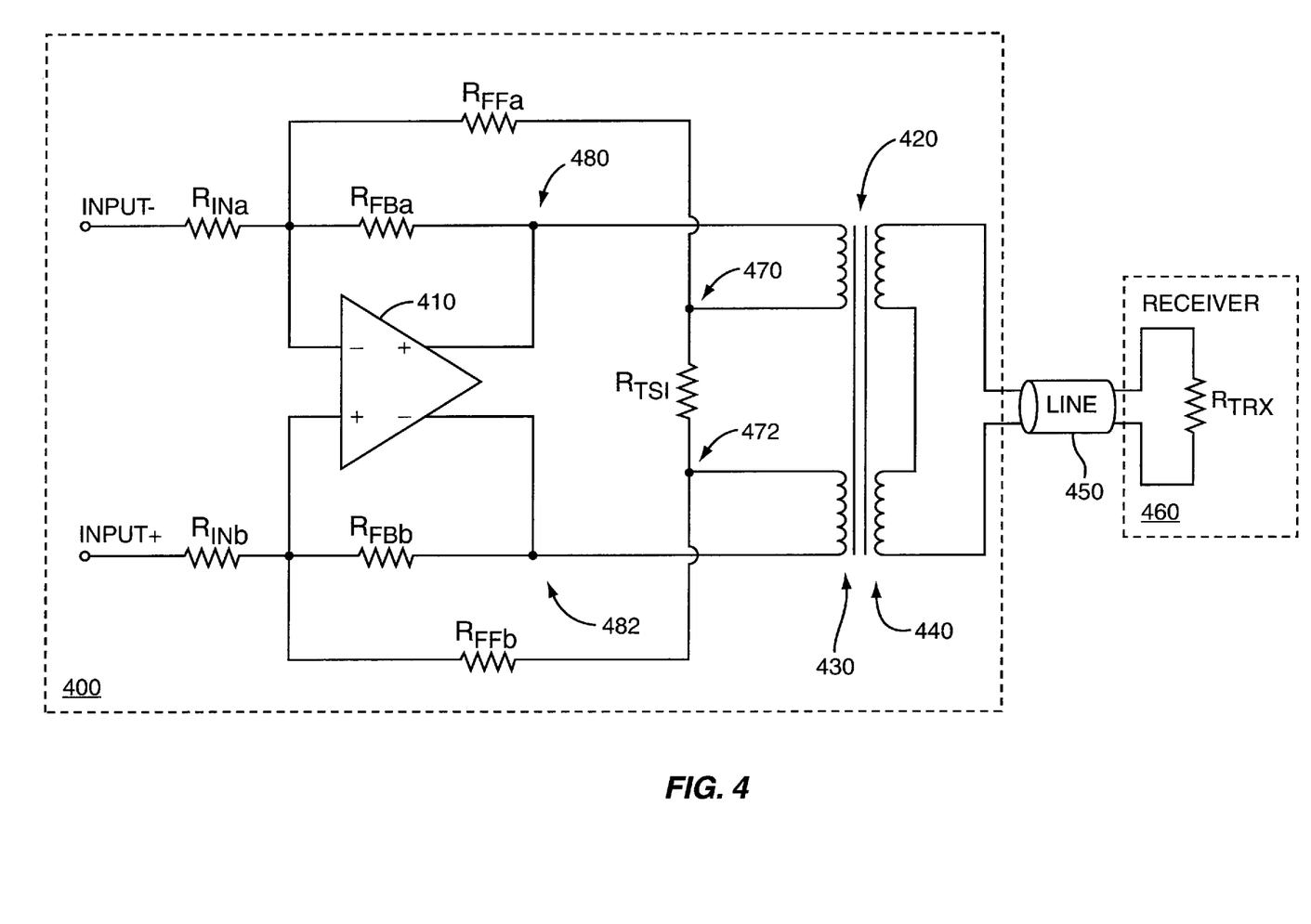
FIG. 4 is a block diagram of another embodiment of an Ethernet-compliant line driver output stage.

FIG. 4 illustrates another embodiment of an output stage 400 that may be included in the line driver circuits 100 and 200 of FIGS. 1 and 2, respectively. According to this embodiment, the output stage 400 is tailored for Ethernet technologies. The output stage 400 includes a voltage-mode line driver 410 for generating an Ethernet-compliant output signal and feedback, feed-forward and termination impedances $R_{FB}$, $R_{FF}$ and $R_{TSI}$, respectively. The output stage 400 also includes a transformer 420 having a primary winding 430 and a secondary winding 440. The secondary winding can be connected to a transmission line 450 for communicating with an Ethernet receiver 460 having termination impedance $R_{TRX}$. However, the termination resistor $R_{TSI}$ is not segmented into two elements according to this embodiment. Instead, the termination resistor $R_{TSI}$ is coupled between two ports 470, 472 of the primary winding 430.

Particularly, a first feedback impedance element $R_{FBa}$ is coupled between a first input terminal 480 of the primary winding 430 and a first input impedance element $R_{INa}$. A second feedback impedance element $R_{FBb}$ is coupled between a second input terminal 482 of the primary winding 430 and a second input impedance element $R_{INb}$. The termination impedance $R_{TSI}$ is coupled between the first and second tap points 470, 472 of the primary winding 430. A first feed-forward impedance element $R_{FFa}$ is coupled between the first tap point 470 and the first input impedance element $R_{INa}$ while a second feed-forward impedance element $R_{FFb}$ is coupled between the second tap point 472 and the second input impedance element $R_{INb}$. The magnitude of the termination impedance $R_{TSI}$ can still be modified as described above to alter the magnitude of the voltage output swing applied to the primary winding 430, enabling the output stage 400 to accommodate different Ethernet technologies.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A line driver circuit, comprising:
a plurality of output stages each operable to produce an output signal in compliance with a wireline communication technology;
a pre-output stage operable to perform one or more functions common to the plurality of output stages; and
circuitry operable to determine which wireline communication technology is implemented by the line driver circuit based on a mode input provided to the circuitry, couple to the pre-output stage each output stage operable to produce an output signal that complies with the wireline communication technology indicated by the mode input, and decouple from the pre-output stage each output stage that is not operable to produce an output signal that complies with the wireline communication technology indicated by the mode input,
wherein each output stage comprises an amplifier and feedback and feed-forward impedances selectively coupled between the amplifier and the pre-output stage.

2. The line driver circuit of claim 1, wherein the mode input is programmable and the circuitry is operable to reconfigure which of the plurality of output stages are coupled to the pre-output stage and which of the plurality of output stages are decoupled from the pre-output stage responsive to a change in the mode input.

3. The line driver circuit of claim 1, wherein the circuitry comprises:
a first group of switches operable to selectively couple and decouple different ones of the plurality of output stages to the pre-output stage based on the mode input; and
a second group of switches operable to deactivate each output stage decoupled from the pre-output stage.

4. The line driver circuit of claim 1, wherein the pre-output stage comprises biasing circuitry operable to bias each output stage coupled to the pre-output stage.

5. The line driver circuit of claim 4, wherein the amount of bias provided by the biasing circuitry is programmable based on the number and performance requirements of the output stages coupled to the pre-output stage.

6. The line driver circuit of claim 1, wherein the mode input is hardwired.

7. The line driver circuit of claim 1, wherein the circuitry is operable to couple to the pre-output stage each output stage operable to produce an output signal which satisfies voltage and current conditions associated with the wireline communication technology indicated by the mode input.

8. The line driver circuit of claim 1, wherein one or more of the plurality of output stages are operable to meet signal requirements for a xDSL technology when coupled to the pre-output stage, and wherein one or more different ones of the plurality of output stages are operable to meet signal requirements for an E-carrier technology or T-carrier technology when coupled to the pre-output stage.

9. The line driver circuit of claim 1, wherein at least one of the plurality of output stages comprises:
a voltage-mode line driver having an input, an output and an output impedance;
a feedback impedance coupled between the output and the input of the voltage-mode line driver;
a feed-forward impedance coupled between the input and the output of the voltage-mode line driver;
a termination impedance coupled between the output of the voltage-mode line driver and a transmission line and operable to sense current and voltage output by the voltage-mode line driver;
wherein the output impedance of the voltage-mode line driver is synthesized based on the feedback and feed-forward impedances;
wherein a total output impedance of the output stage corresponds to the output impedance of the voltage-mode line driver and the termination impedance and approximately matches an impedance of the transmission line; and
wherein the magnitude of the termination impedance corresponds approximately to the difference between the transmission line impedance and the output impedance of the voltage-mode line driver.

10. A line driver circuit, comprising:
a plurality of output stages each operable to produce an output signal in compliance with a wireline communication technology;
a pre-output stage operable to perform one or more functions common to the plurality of output stages; and
circuitry operable to determine which wireline communication technology is implemented by the line driver circuit based on a mode input provided to the circuitry, couple to the pre-output stage each output stage operable to produce an output signal that complies with the wireline communication technology indicated by the mode input, and decouple from the pre-output stage each output stage that is not operable to produce an output signal that complies with the wireline communication technology indicated by the mode input,
wherein the plurality of output stages are operable to meet signal requirements for at
least two different ones of 10BASE-T Ethernet, 100BASE-T Ethernet, Gigabit Ethernet, 10 Gigabit Ethernet and 100 Gigabit Ethernet when coupled to the pre-output stage, or
wherein one or more of the plurality of output stages are operable to meet signal requirements for a xDSL technology when coupled to the pre-output stage, and wherein one or more different ones of the plurality of output stages are operable to meet signal requirements for an E-carrier technology or T-carrier technology when coupled to the pre-output stage.

11. A method of configuring a line drive circuit, comprising:
providing a plurality of output stages each operable to produce an output signal in compliance with a wireline communication technology;
providing a pre-output stage operable to perform one or more functions common to the plurality of output stages;
determining which wireline communication technology is implemented by the line driver circuit based on a mode input;
coupling to the pre-output stage each output stage operable to produce an output signal that complies with the wireline communication indicated by the mode input; and
decoupling from the pre-output stage each output stage that is not operable to produce an output signal that complies with the wireline communication technology indicated by the mode input, and
programming an amount of bias provided to each output stage coupled to the pre-output stage based on the number of output stages coupled to the pre-output stage.

12. The method of claim 11, comprising selectively coupling one or more inverting amplifiers to the pre-output stage based on the mode input.

13. The method of claim 11, comprising reconfiguring which of the plurality output stages are coupled to the pre-output stage and which of the plurality of output stages are decoupled from the pre-output stage responsive to a change in the mode input.

14. The method of claim 13, comprising reconfiguring which of the plurality output stages are coupled to the pre-output stage and which of the plurality of output stages are decoupled from the pre-output stage responsive to the mode input indicating a change from one Ethernet technology to another Ethernet technology.

15. The method of claim 13, comprising reconfiguring which of the plurality output stages are coupled to the pre-output stage and which of the plurality of output stages are decoupled from the pre-output stage responsive to the mode input indicating a change from a digital subscriber loop technology to an E-carrier technology or T-carrier technology or from the E-carrier technology or the T-carrier technology to the digital subscriber loop technology.

16. The method of claim 11, comprising applying a ground potential to an n-FET transistor and a voltage potential to a p-FET transistor included in each inverting amplifier decoupled from the stage.

* * * * *